(12) United States Patent
Rabinovitch et al.

(10) Patent No.: US 8,787,256 B2
(45) Date of Patent: Jul. 22, 2014

(54) METHOD AND APPARATUS FOR ENSURING TRANSMISSION OF CRITICAL DATA THROUGH A WIRELESS ADAPTER

(75) Inventors: Shamir Rabinovitch, Givat Ada (IL); John B. Preston, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 623 days.

(21) Appl. No.: 12/959,567

(22) Filed: Dec. 3, 2010

(65) Prior Publication Data

US 2012/0140707 A1 Jun. 7, 2012

(51) Int. Cl.
*H04W 4/00* (2009.01)

(52) U.S. Cl.
USPC ........... 370/328; 370/338; 370/331; 370/332; 370/333; 370/362; 709/52; 709/230; 709/238

(58) Field of Classification Search
USPC .......................... 370/328, 392, 310, 331–333
See application file for complete search history.

(56) References Cited

U.S. PATENT DOCUMENTS

| | | | |
|---|---|---|---|
| 7,460,855 B2 | 12/2008 | Barkley et al. | |
| 2005/0018627 A1* | 1/2005 | Cardei et al. | 370/328 |
| 2007/0086377 A1* | 4/2007 | Alapuranen | 370/329 |
| 2007/0217436 A1* | 9/2007 | Markley et al. | 370/401 |
| 2007/0281743 A1 | 12/2007 | Palin et al. | |
| 2008/0081560 A1* | 4/2008 | Jougit | 455/41.2 |
| 2009/0238111 A1* | 9/2009 | Hirano et al. | 370/328 |
| 2011/0034126 A1* | 2/2011 | Higgins et al. | 455/41.2 |
| 2011/0099437 A1* | 4/2011 | Ramakrishnan et al. | 714/704 |
| 2011/0177804 A1* | 7/2011 | Lindner | 455/422.1 |
| 2013/0322265 A1* | 12/2013 | Kozisek et al. | 370/251 |

FOREIGN PATENT DOCUMENTS

| | | |
|---|---|---|
| KR | 10-2004-0104411 A | 12/2004 |
| KR | 10-2010-0097921 A | 9/2010 |

OTHER PUBLICATIONS

Bluetooth Specification Version 1.0 B, Title: Host Controller Interface Functional Specification, Published in Nov. 29, 1999.*
International Search Report and Written Opinion for counterpart International Patent Application No. PCT/US2011/063039 mailed on Feb. 28, 2012.

* cited by examiner

*Primary Examiner* — Faruk Hamza
*Assistant Examiner* — Shah R Zaman
(74) *Attorney, Agent, or Firm* — Barbara R. Doutre (57) ABSTRACT

In embodiments a host reserves capacity of a wireless adapter for critical data transmission. Critical data is injected into a transport interface of the host, which passes the critical data to the wireless adapter for wireless transmission to a destination device.

17 Claims, 4 Drawing Sheets

METHOD AND APPARATUS FOR ENSURING TRANSMISSION OF CRITICAL DATA THROUGH A WIRELESS ADAPTER

FIELD OF THE INVENTION

The invention relates generally to wireless adapters, and more particularly to the transmission of critical data from a host device to a destination device.

BACKGROUND OF THE INVENTION

Wireless interfaces are increasing being used between devices as a means of transmitting data from one device to another. Many such wireless interfaces use radio transmission techniques. For example, the Institute of Electrical and Electronic Engineers (IEEE) has set forth several standards defining local and personal area wireless protocols and specifications. Some examples of these standards are known commonly by names such as WiFi, and by trade names such as Bluetooth.

Personal area networking, such as that substantially conforming to the IEEE 802.15.1 standard, is being increasingly used between devices meant to be used by the same person cooperatively. Examples of which include interfaces between cellular phones and earpieces, speakerphone devices, and automobile audio systems, interfaces between personal computers and wireless keyboards and other input devices, and so on. In some of these applications there can be a critical need to transmit data from one device to another, where latency must be minimized.

One example of such a critical application is in the link between a two way radio and an associated remote microphone device, as is common in public safety applications. Two way radios provide "push to talk" (PTT) operation, where the user can press a button on the device and commence speaking almost instantly, where the two-way radio commences transmitting the voice data as the user commences speaking. This kind of operation differs from other communication systems such as, for example, cellular telephony, where a call circuit must be set up, and the called party must answer a call at their end before the caller can commence speaking. In PTT systems, when the user presses the talk button, the radio begins transmitting, and radios receiving the transmission audibly reproduce the user's voice without requiring interaction from a user at the receiving radio.

Since the near-instant communication aspect of PTT operation is crucial, it is desirable to avoid any latency. However, conventional personal area networking protocols can introduce latency in several ways. For example, data sent to the personal area network protocol stack must be processed through the protocol stack. There are several layers of processing before the data is passed to the wireless adapter for transmission, and these layers of processing, while of adequate speed for most applications, can introduce an undesirable amount of latency in PTT applications. Furthermore, since PTT data may not be the only data being exchanged between a remote accessory and the two-way radio device, the protocol stack can subject PTT data to flow control procedures which introduce undesirable latency into the communication. Accordingly, there is a need for a means by which personal area networking techniques can be implemented in applications with critical latency considerations.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
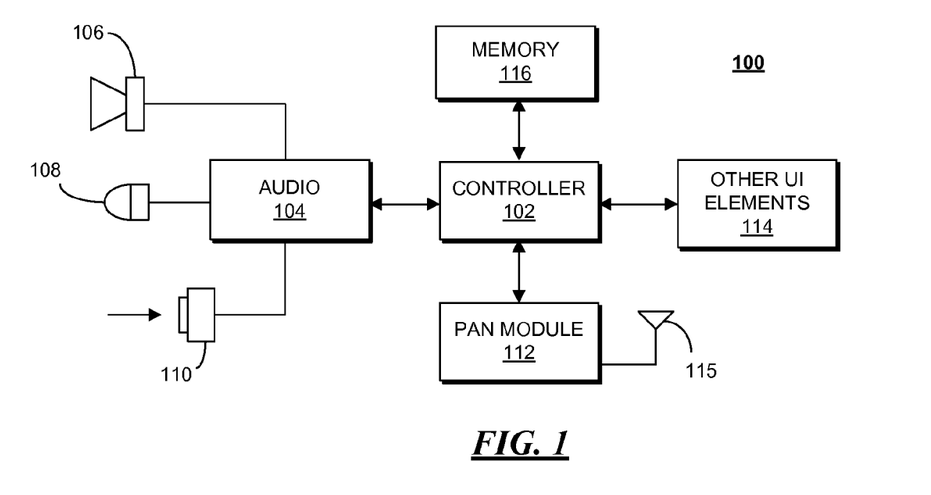
FIG. 1 shows a block schematic diagram of a host device including a personal area network module, in accordance with an embodiment.

Referring to FIG. 1, there is shown a block schematic diagram of a host device 100 including a personal area network module, in accordance with an embodiment. The device represented by the present figure is only meant to be an example, and those skilled in the art will recognize that numerous embodiments exist to which the teachings discussed herein can be applied. in the present embodiment, the host device includes a controller 102, which can be a microcontroller or microprocessor capable of processing data, receive input, and provide output, responsive to instruction code executed by the controller. The present embodiment further includes an audio processor 104 which converts digital audio signals to analog signals to be played over a speaker 106, and which receives analog signals from a microphone 108 and converts them to digital audio signals that can be processed by the controller. The audio processor can be responsive to a "push to talk" (PTT) button 110, which, upon being pushed or otherwise actuated, indicates a user of the device will be speaking Accordingly, an analog audio signal will be received at the microphone 108 from the user as the user speaks, and the audio data is to be transmitted from the host device by a personal area network (PAN) module 112. The PAN module represents a type of wireless adapter, and those skilled in the art will appreciate that other types of wireless adapters exist which can be used substantially interchangeably in accordance with the present teachings. The PAN module can be, for example, a wireless adapter operating in accordance with the IEEE 802.15.1 standard. An example of which is known in the industry by the trade name Bluetooth. The PAN module include a wireless transceiver for transmitting and receiving radio signals. An antenna 115 can be used to facilitate radio operation. The host device can contain other user interface elements 114, such as, for example, a graphic display, keypad, camera, and so on.

The controller operates according to instruction code which can be stored in memory 116. Memory 116 as shown represents an aggregate memory and can include read only memory (ROM), random access memory (RAM), re-programmable memory, and so on. The memory is a tangible, non-transitory, machine readable storage medium, and can store instruction code that, when executed by the controller, performs functions in accordance with the teachings herein. The host device 100 can be, for example, a remote audio accessory that wirelessly interface, via the PAN module 112, with a two-way radio. Both the remote audio accessory and two-way radio can both be worn on a user's body, and wirelessly interact with each other. For example, the user can press the PTT button 110, and the host device 100 can commence sending audio data to the two-way radio for transmission to other radios operating in a radio network, or directly to other radios. The host device instruction code includes instruction code for instantiation a protocol stack for interfacing with the PAN module.

Figure 2:
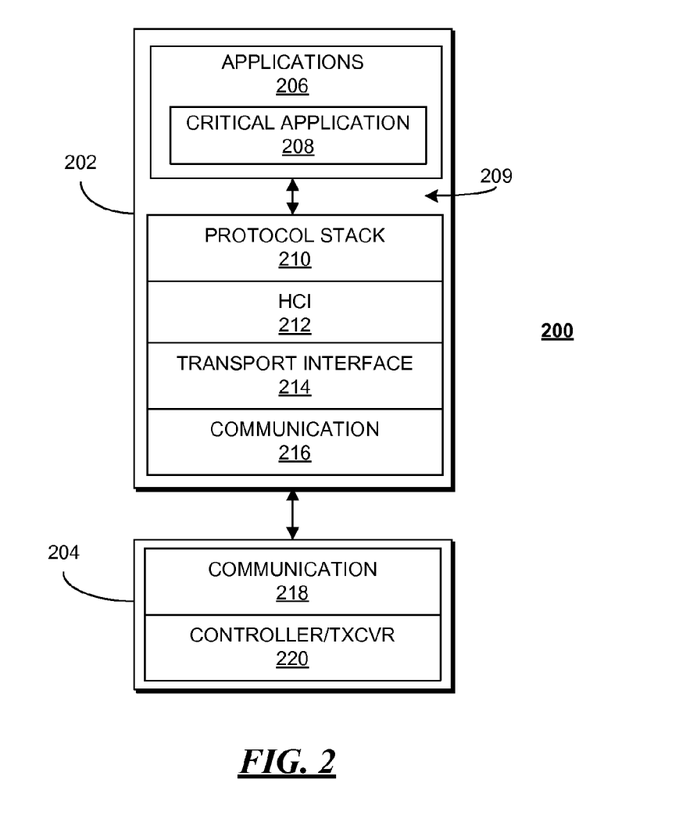
FIG. 2 shows an abstraction diagram of the various operating layers of a host and wireless adapter, in accordance with an embodiment.

FIG. 2 shows an abstraction diagram of the various operating layers 200 of a host and wireless adapter, in accordance with an embodiment. The various layers illustrated here and in subsequent abstraction diagrams represent operational layers which are implemented by instruction code executed by one or more processors and additional hardware elements, as necessary, or as instruction code embodied in a computer program product comprised of one or more tangible non-transitory machine or computer readable storage mediums, which when executed by one or more processors will instantiate interfaces and layers corresponding to the abstractions taught herein. Host layers 202 represent functionality of a host device, which can be implemented, for example, by a host controller such as controller 102 of FIG. 1, while adapter layers 204 represent functionality of a wireless adapter, such as PAN module 112 of FIG. 1. The operational layers shown here are not meant to be exhaustive, and those skilled in the art will appreciate that a host controller can perform many other functions not represented in the present diagram, or other abstraction diagrams discussed herein. Likewise, the different layers illustrated here can be further defined at a finer abstraction granularity, however, the present abstraction level is intended to focus on inventive embodiments, rather than duplicate well known details.

The host layers include, at the highest level of the present abstraction, an application layer 206. The application layer is a layer at which applications operate, and is supported by lower layers. Among the applications is a critical application 208. The critical application 208, when invoked, can have critical data to be transmitted by the wireless adapter layers 204. When non-critical applications 206 need to have data transmitted by the wireless adapter they pass the non-critical data to a protocol stack 210 via an operating system to hardware interface 209, which can be, for example, a device driver for a personal area network module which can include one or more dynamic link libraries (DLLs). The protocol stack 210 process the non-critical data and prepares it for transmission down through other layers and finally passes the non-critical data to a host controller interface (HCI) 212. The HCI 212 provides a command interface to a baseband controller and link manager for the wireless adapter, and access to hardware status and control registers of the wireless adapter. The HCI 212 passes data to the HCI transport interface, or simply transport interface 214, which interfaces with the physical hardware communication 216 to the wireless adapter 204. For example the communication 216 can be a conventional three wire universal asynchronous receiver/transmitter (UART) for a RS232 link to the wireless adapter 204. The communication hardware 216 of the host 202 communicates with communication hardware 218 of the wireless adapter 204. The wireless adapter communication 218 passes data to the wireless adapter hardware, which operates according to instruction code stored therein, and can include firmware for a host controller interface layer corresponding to the HCI layer 212 that can respond to messaging from the HCI 212. The wireless adapter hardware contains a transceiver for transmitting and receiving radio signal, and transmits the data to a destination using either a synchronous link or an asynchronous link.

Figure 3:
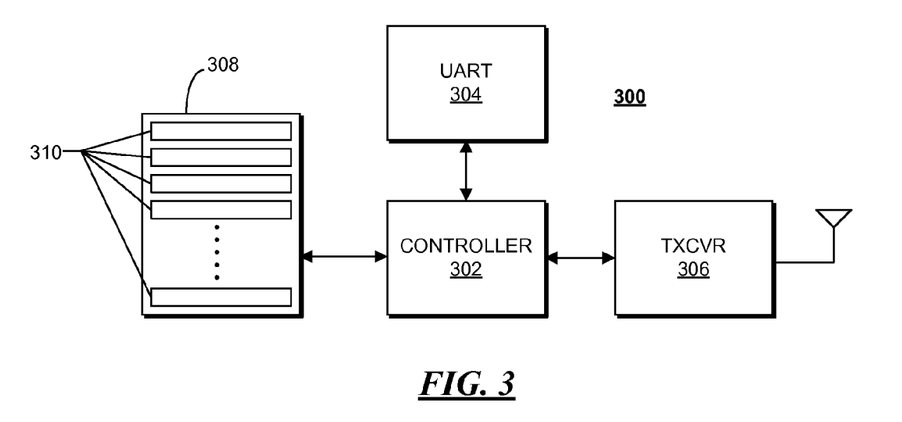
FIG. 3 shows a block schematic diagram of a wireless adapter, in accordance with an embodiment.

FIG. 3 shows a block schematic diagram of a wireless adapter 300, in accordance with an embodiment. The wireless adapter 300 can be an implementation of PAN module 112 and can be embodied as a stand-alone integrated circuit. The wireless adapter 300 includes a controller 302 which can be a microprocessor or microcontroller. The controller 302 executes instruction code which can be provided as firmware in a firmware memory (not shown) of the wireless module 300. The wireless adapter 300 can communicate with a host processor via a UART 304, operated in accordance with adapter communication layer 218 of FIG. 2. The wireless adapter 300 further comprises a radio transceiver (TXCVR) 306 for transmitting and receiving data to and from, respectively, a destination device. Data is held in buffers 310 in a buffer memory. The wireless adapter can handle a maximum data capacity based on the number of buffers 310 that are provided in the buffer memory. The number of buffers is determined by the host and is used by the protocol stack 210 to arbitrate data flow from applications 206. In order to ensure transmission of critical data in a timely manner, some data flow capacity can be reserved to ensure there is capacity available upon receipt of critical data.

Figure 4:
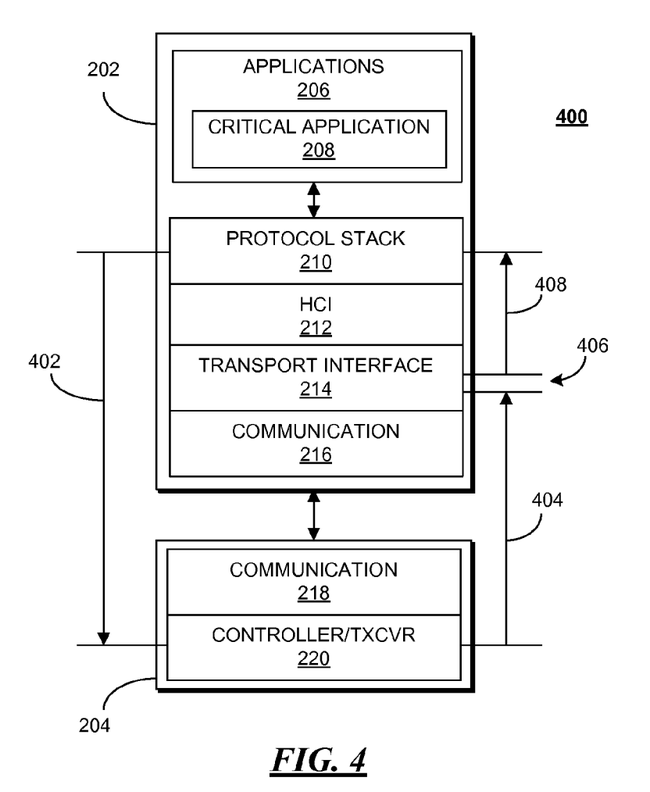
FIG. 4 shows an abstraction diagram of a process for reserving transmission capacity, in accordance with an embodiment.

FIG. 4 shows an abstraction diagram of a process for reserving transmission capacity 400, in accordance with an embodiment. Some wireless adapters can be configured to reserve flow capacity for transmission of critical data. However, most readily available PAN modules do not support such function. The process includes determining a maximum capacity value of the transmission capacity of the wireless adapter, and informing the layers above the transport layer 214 of a reduced or decremented capacity value, which lower than the maximum capacity value. The effect is that the upper layers of the host operate using a reduced or decremented flow capacity value for the wireless adapter. The difference between the maximum capacity value and the decremented capacity value is the reserved capacity value useable by critical applications. The maximum capacity value can be based on the number of buffers 310 available in the wireless adapter.

In one embodiment a determination of the maximum capacity value can be performed by a capacity query 402, which can come from the protocol stack 210 upon initialization of the host 202. In embodiments using Bluetooth protocols, the capacity query can be a HCI_READ_BUFFER_SIZE command. The capacity query 402 requests the wireless adapter 204 to indicate its capacity for transmitting data. A response to the capacity query 404 indicating the maximum capacity value is intercepted 406 by the transport interface 214. The transport interface 214 reduces or decrements the maximum capacity value to produce a reduced or decremented capacity value 408 which is returned to the protocol stack or other entity which issued the capacity query. For example, if the wireless adapter 204 contains ten buffers, the response the capacity query will indicate that there are ten buffers. The transport interface 214 will decrement this by at least one, and return a result to the higher layers indicating that there is not more than nine buffers available, thus, the tenth buffer will never be used for non-critical data because the higher layers will not know of the tenth buffer's existence.

The amount that the maximum capacity value is reduced by can be set by the critical application 208, by user preference, or other means. Furthermore, while the process occurs upon initialization, it is contemplated that the host can re-initialize the stack to change the reserved capacity value, and provide the transport interface 214 with a new or different value by which to reduce or decrement the maximum capacity value upon re-initialization. The new value by which the maximum capacity value is decremented can be selected by the critical application or upon instantiation of an additional critical application. Once the desired capacity has been reserved critical applications can use the reserved capacity for transmitting critical data with minimal latency.

Figure 5:
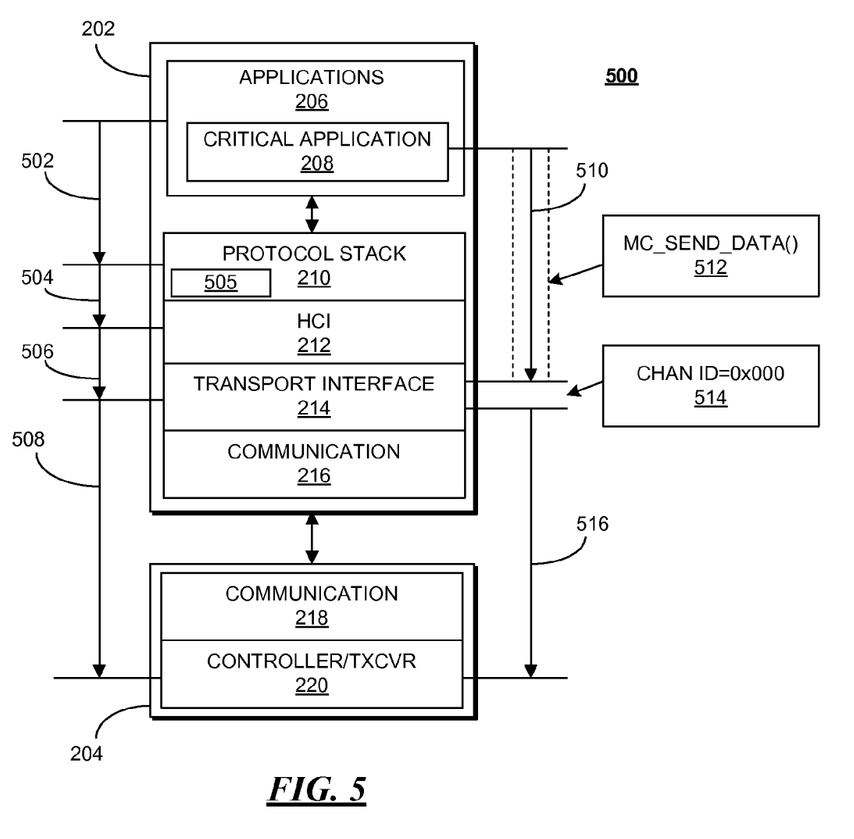
FIG. 5 shows an abstraction diagram comparing transmission of non-critical and critical data, in accordance with an embodiment.

FIG. 5 shows an abstraction diagram 500 comparing transmission of non-critical and critical data, in accordance with an embodiment. In transmitting non-critical data, a non-critical application sends data 502 to the protocol stack 210 using a non-critical call or command 505. The non-critical data is processed by the protocol stack 210, which can include formatting the non-critical data. The non-critical data can then be passed 504 to the HCI layer 212, and then it is passed 506 to the transport interface 214, where it is then passed 508 across the communication link 216, 218 to the wireless adapter. On the way down the stack the non-critical data can be subject to queuing, formatting, and other operations which introduce latency into the process.

Conversely, when the critical application 208 needs to transmit critical data, the critical application can invoke a command 512 to pass 510 the critical data directly to the transport interface 214. Since the critical application is bypassing the protocol stack and other layers, the critical data can be said to be injected in the transport interface by the critical application. The command 512 allows the critical application direct access to the transport interface 214. The transport interface 214 can then format the critical data for format the critical data for transport to a destination device. The critical data can be handled by a Logical Link Control and Adaptation Protocol (L2CAP) function of the host which packetizes data for applications and provides connection-oriented and connectionless data services to upper layer protocols with protocol multiplexing capability, segmentation and reassembly operation, and group abstractions. In Bluetooth specific embodiments, the L2CAP permits higher level protocols and applications to transmit and receive L2CAP data packets up 64 Kilobytes in length.

Typical packetizing includes providing certain data fields in packet headers. When critical data is included in a packet, one or more fields can indicate such. For example, one or more header fields can include a value that has been pre-selected to identify critical data packets. In other embodiments the value of a given field can be set to an illegal or undefined value to indicate the inclusion of critical data. For example, a channel identifier field can be set to an illegal or undefined value, such as 0x0000 514. Once formatted the transport interface passes 516 the critical data, appropriately packetized, to the wireless adapter 204, which buffers the packet for transmission. Since the protocol stack operates as if there is at least one less buffer than is actually available, there will be at least one buffer in the wireless adapter 204 available for the critical data. The critical data can then be transmitted in a timely manner to the destination device using, for example, an asynchronous link between the host 202 and the destination device.

Figure 6:
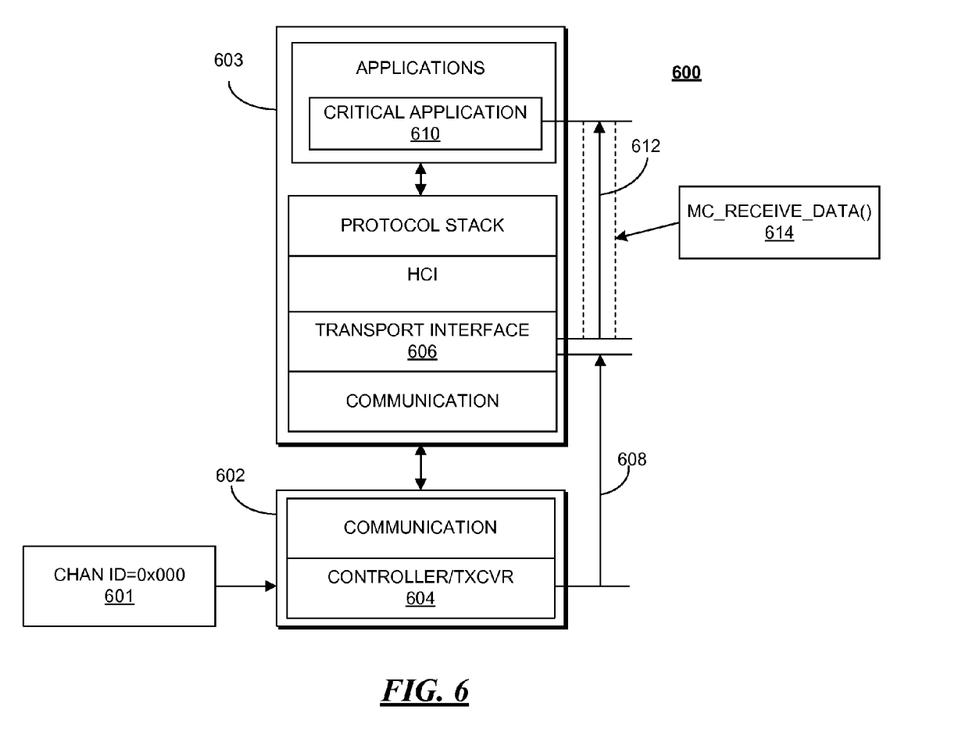
FIG. 6 shows an abstraction diagram for receiving critical data, in accordance with an embodiment.

FIG. 6 shows an abstraction diagram for receiving critical data at a destination device 600, in accordance with an embodiment. A packet 601 including critical data is received by a wireless adapter 602 of the destination device 600. The packet 601 is in turn passed 608 to the destination host 603 at the transport interface 606 of destination host 603. The transport interface 606 will pass non-critical data up the layers, through the HCI and protocol stack where it is processed and then passed to the application layer. In the present example, however, since the data 601 is critical data, and indicated by a field in the data packet, such as a channel identifier field, the transport interface 606 passes 612 the critical data directly to a corresponding critical application 610. The transport interface 606 can pass the critical data to the critical application 610 such as by a call to an application programming interface 614 of the critical application 610. In one embodiment the critical application 610 can be a push to talk application, and the destination device can be a two-way radio, wherein the critical data is voice data for a push to talk communication initiated at a sending device such as a remote audio accessory which is sending the critical data to the two way radio for transmission into a radio network.

Accordingly, those skilled it the art will realize that embodiments of the present teachings include a method for ensuring transmission of critical data from a host device which commences by determining a maximum capacity value of a data transmission capacity of a wireless adapter associated with the host device, which is performed at a transport interface of the host device, and wherein the transport interface interfaces with the wireless adapter. The method further commences by decrementing the maximum capacity value, producing a decremented capacity value, at the transport interface, wherein a reserved capacity value is the difference between the maximum capacity value and the decremented capacity value. The method further commences allowing non-critical data to be transmitted according to the decremented capacity value through a non-critical interface to the transport interface, and transmitting critical data using a reserved capacity of the wireless adapter corresponding to the reserved capacity value, wherein the critical data is injected into the transport interface at a critical interface of the transport interface.

Other embodiments can include a computer program product, for a host device, embodied in a machine readable storage medium, the host device having a processor, the computer program product having stored therein instruction code which when executed by the processor determines a maximum capacity value of a data transmission capacity of a wireless adapter associated with the device, performed at a transport interface of the host device, wherein the transport interface interfaces with the wireless adapter. The computer program product further including instruction code which when executed by the processor decrements the maximum capacity value, producing a decremented capacity value, at the transport interface, wherein a reserved capacity value is the difference between the full capacity value and the decremented capacity value. The computer program product further including instruction code which when executed by the processor allows non-critical data to be transmitted according to the decremented capacity value through a non-critical interface to the transport interface. The computer program product further including instruction code which when executed by the processor transmits critical data using a reserved capacity of the wireless adapter corresponding to the reserved capacity value, wherein the critical data is injected into the transport interface at a critical interface of the transport interface.

Additional embodiments can include a method for handling critical data at a destination device, commenced by receiving a data packet from a remote device at a wireless adapter of the destination device. The method further commencing by passing the data packet to a transport interface of the destination device. The method further commencing by determining at the destination device that a header field of the data packet indicates the packet contains critical data. The method further commencing by passing the critical data directly to a corresponding critical application instantiation of the host device, wherein the critical data does not pass through a protocol stack associated with the wireless adapter.

This invention can be embodied in other forms without departing from the spirit or essential attributes thereof. Accordingly, reference should be made to the following claims, rather than to the foregoing specification, as indicating the scope of the invention.

What is claimed is:

1. A method for ensuring transmission of critical data from a host device, comprising:
   determining, at a transport interface of the host device, a maximum capacity value of a data transmission capacity of a wireless adapter associated with the host device wherein the transport interface interfaces with the wireless adapter;
   decrementing, at the transport interface, the maximum capacity value to produce a decremented capacity value, wherein a reserved capacity value is the difference between the maximum capacity value and the decremented capacity value;
   allowing non-critical data to be transmitted according to the decremented capacity value such that the non-critical data is passed via at least one operating layer to the transport interface for transmission, wherein the at least one operating layer is an intermediate layer between the transport interface and a layer above the transport interface; and
   transmitting critical data using the reserved capacity of the wireless adapter corresponding to the reserved capacity value, such that the critical data bypasses the at least one operating layer and is injected directly into the transport interface for transmission.

2. The method of claim 1, wherein determining the maximum capacity value comprises:
   transmitting a capacity query to the wireless adapter from the host device at the layer above the transport interface; and
   intercepting a response to the capacity query from the wireless adapter at the transport interface indicating the maximum capacity value.

3. The method of claim 2, wherein the response to the capacity query indicates a number of buffers of the wireless adapter as the maximum capacity value, and wherein decrementing the maximum capacity value comprises decrementing the number of buffers by at least one.

4. The method of claim 2, wherein transmitting the capacity query is performed in response to the host device initializing a software protocol stack for interfacing with the wireless adapter.

5. The method of claim 4, wherein the capacity query comprises a HCI_READ_BUFFER_SIZE command.

6. The method of claim 1, further comprising:
   responsive to the critical data being injected into the transport interface, formatting, by the transport interface, the critical data into at least one packet where the at least one packet includes a data field, and wherein the transport interface adjusts the data field to indicate at least one packet contains critical data.

7. The method of claim 6, wherein the data field is a channel identifier, and the transport interface adjusts the channel identifier by setting the channel identifier to an illegal value.

8. The method of claim 1, further comprising transmitting the critical data to a destination device via the wireless adapter using an asynchronous connection-less link between the wireless adapter of the host device and a destination wireless adapter of the destination device.

9. The method of claim 1, wherein the critical data includes voice data from a "push to talk" event at the host device.

10. A non-transitory computer program product, for a host device, embodied in a machine readable storage medium, the host device having a processor, the computer program product comprising:
    instruction code which when executed by the processor determines a maximum capacity value of a data transmission capacity of a wireless adapter associated with the host device at a transport interface of the host device, wherein the transport interface interfaces with the wireless adapter;
    instruction code which when executed by the processor decrements, at the transport interface, the maximum capacity value to produce a decremented capacity value, wherein a reserved capacity value is the difference between the maximum capacity value and the decremented capacity value;
    instruction code which when executed by the processor allows non-critical data to be transmitted according to the decremented capacity value through a non-critical interface to the transport interface; and
    instruction code which when executed by the processor transmits critical data using the reserved capacity of the wireless adapter corresponding to the reserved capacity value, such that the critical data bypasses at least one operating layer and is injected directly into the transport interface for transmission, wherein the at least one operating layer is an intermediate layer between the transport interface and a layer above the transport interface.

11. The non-transitory computer program product of claim 10, wherein the instruction code that determines the maximum capacity value comprises:
    instruction code which when executed by the processor transmits a capacity query to the wireless adapter from the host device at the layer above the transport interface; and
    instruction code which when executed by the processor intercepts a response to the capacity query from the wireless adapter at the transport interface indicating the maximum capacity value.

12. The non-transitory computer program product of claim 11, wherein the instruction code which transmits the capacity query is invoked in response to the host device initializing a software protocol stack for interfacing with the wireless adapter.

13. The non-transitory computer program product of claim 12, wherein the capacity query comprises a HCI_READ_BUFFER_SIZE command.

14. The non-transitory computer program product of claim 10, further comprising instruction code for the transport interface which when executed by the processor, in response to the critical data being injected into the transport interface, causes the transport interface to format the critical data into at least one packet where the at least one packet includes a data field, and wherein the instruction code for the transport interface adjusts the data field to indicate at least one packet contains critical data.

15. The non-transitory computer program product of claim 14, wherein the data field is a channel identifier, and the instruction code for the transport interface adjusts the channel identifier by setting the channel identifier to an illegal value.

16. The method of claim 1 wherein the at least one operating layer comprises a protocol stack.

17. The non-transitory computer program product of claim 10, wherein the at least one operating layer comprises a protocol stack.

* * * * *

UNITED STATES PATENT AND TRADEMARK OFFICE
CERTIFICATE OF CORRECTION

PATENT NO. : 8,787,256 B2  
APPLICATION NO. : 12/959567  
DATED : July 22, 2014  
INVENTOR(S) : Shamir Rabinovitch et al.

Page 1 of 1

It is certified that error appears in the above-identified patent and that said Letters Patent is hereby corrected as shown below:

IN THE TITLE PAGE:

Item (75), under "Inventors", in Column 1, Line 1, delete "Givat Ada" and insert
-- Binyamina-Giv'at Ada --, therefor.

IN THE SPECIFICATION:

In Column 2, Line 42, delete "applied. in" and insert -- applied. In --, therefor.

In Column 2, Line 54, delete "speaking" and insert -- speaking. --, therefor.

Signed and Sealed this  
Tenth Day of May, 2016

Michelle K. Lee  
*Director of the United States Patent and Trademark Office*